United States Patent
Kim et al.

(10) Patent No.: US 10,952,249 B2
(45) Date of Patent: Mar. 16, 2021

(54) METHOD FOR TRANSMITTING UPLINK SIGNAL THROUGH MULTIPLE UNLICENSED COMPONENT CARRIERS IN WIRELESS COMMUNICATION SYSTEM SUPPORTING UNLICENSED BAND, AND DEVICE SUPPORTING SAME

(71) Applicant: LG Electronics Inc., Seoul (KR)

(72) Inventors: Seonwook Kim, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/325,917

(22) PCT Filed: Aug. 16, 2017

(86) PCT No.: PCT/KR2017/008879
§ 371 (c)(1),
(2) Date: Feb. 15, 2019

(87) PCT Pub. No.: WO2018/034485
PCT Pub. Date: Feb. 22, 2018

(65) Prior Publication Data
US 2019/0191459 A1    Jun. 20, 2019

Related U.S. Application Data

(60) Provisional application No. 62/376,410, filed on Aug. 18, 2016.

(51) Int. Cl.
*H04W 16/14*    (2009.01)
*H04W 72/12*    (2009.01)
(Continued)

(52) U.S. Cl.
CPC ....... *H04W 74/0808* (2013.01); *H04W 16/14* (2013.01); *H04W 72/1268* (2013.01);
(Continued)

(58) Field of Classification Search
CPC . H04W 74/0808; H04W 74/00; H04W 74/08; H04W 16/14; H04W 72/1268; H04W 84/045
See application file for complete search history.

(56) References Cited

U.S. PATENT DOCUMENTS

| | | | |
|---|---|---|---|
| 2013/0064165 A1 | 3/2013 | Chen et al. | |
| 2017/0079028 A1* | 3/2017 | Dinan | H04W 56/001 |
| 2017/0332410 A1* | 11/2017 | Babaei | H04W 24/08 |

FOREIGN PATENT DOCUMENTS

| | | |
|---|---|---|
| WO | WO2015179055 | 11/2015 |
| WO | WO2016021958 | 2/2016 |

(Continued)

OTHER PUBLICATIONS

PCT International Search Report and Written Opinion in International Application No. PCT/KR2017/008879, dated Dec. 7, 2017, 20 pages (with English translation).

(Continued)

*Primary Examiner* — Moo Jeong
(74) *Attorney, Agent, or Firm* — Fish & Richardson P.C.

(57) ABSTRACT

The present invention provides a method for transmitting an uplink signal to a base station by a terminal in a wireless communication system supporting an unlicensed band, and a device supporting the same. More particularly, the present invention provides a method for transmitting an uplink signal through an LBT method of a terminal and a plurality of unlicensed component carriers on the basis of the LBT method when two or more unlicensed component carriers among the plurality of unlicensed component carriers are included in different timing advance groups (TAGs) in a wireless communication system supporting the plurality of unlicensed component carriers, and a device supporting the same.

19 Claims, 18 Drawing Sheets

(51) Int. Cl.
*H04W 74/00* (2009.01)
*H04W 74/08* (2009.01)
*H04W 84/04* (2009.01)

(52) U.S. Cl.
CPC .......... *H04W 74/00* (2013.01); *H04W 74/08* (2013.01); *H04W 84/045* (2013.01)

(56) References Cited

FOREIGN PATENT DOCUMENTS

| WO | WO2016072685 | 5/2016 |
|----|--------------|--------|
| WO | WO2016085295 | 6/2016 |
| WO | WO2016122110 | 8/2016 |

OTHER PUBLICATIONS

Extended European Search Report in European Application No. 17841667.3, dated Mar. 6, 2020, 13 pages.
Samsung, "Discussion on UL transmission for LAA," R1-152872, 3GPP TSG RAN WG1 Meeting #81, Fukuoka, Japan, dated May 25-29, 2015, 5 pages, XP050973756.

\* cited by examiner

FIG. 10
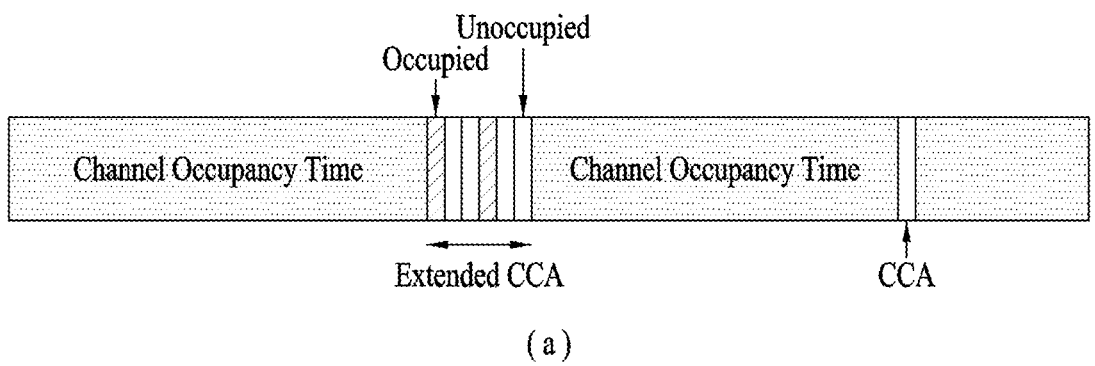
(a)
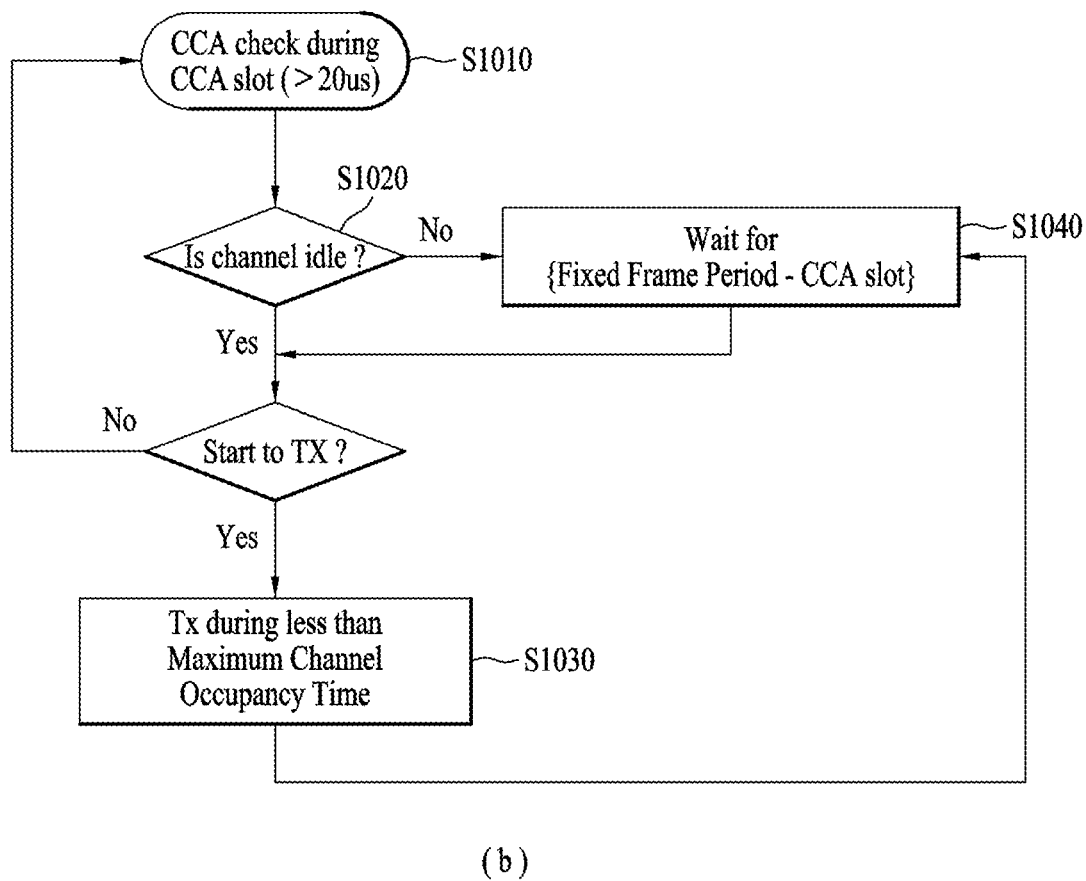
(b)

METHOD FOR TRANSMITTING UPLINK SIGNAL THROUGH MULTIPLE UNLICENSED COMPONENT CARRIERS IN WIRELESS COMMUNICATION SYSTEM SUPPORTING UNLICENSED BAND, AND DEVICE SUPPORTING SAME

CROSS-REFERENCE TO RELATED APPLICATIONS

This application is a National Stage application under 35 U.S.C. § 371 of International Application No. PCT/KR2017/008879, filed on Aug. 16, 2017, which claims the benefit of U.S. Provisional Application No. 62/376,410, filed on Aug. 18, 2016. The disclosures of the prior applications are incorporated by reference in their entirety.

TECHNICAL FIELD

The following description relates to a wireless communication system, and more particularly, to a method of transmitting an uplink signal to a base station by a user equipment in a wireless communication system supportive of an unlicensed band and apparatus supporting the same.

Particularly, if two or more unlicensed component carriers among a plurality of unlicensed component carriers in a wireless communication system supportive of a plurality of the unlicensed component carriers are included in different Timing Advance Groups (TAGs), the following description relates to an LBT method of a user equipment, uplink signal transmitting method through a plurality of unlicensed component carriers based thereon, and apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As more communication devices require larger communication capacities, the demand for a proposal of an operation of each communication device on a contention-based accessible unlicensed band is rising.

At the same time, necessity for mobile broadband communication improved better than the existing Radio Access Technology (RAT) is on the rise as well. Moreover, the next generation communication also considers massive Machine Type Communications (MTC) providing various services anywhere and at any time by connecting a multitude of devise and things together. Besides, a communication system design in consideration of a service/UE sensitive to reliability and latency is taken into consideration.

As described above, the introduction of the next generation RAT considering the enhanced mobile broadband communication, massive MTC, Ultra-reliable and low latency communication (URLLC), and the like has been discussed.

DISCLOSURE OF THE INVENTION

Technical Task

One technical task of the present invention is to provide a method of transmitting an uplink signal in a wireless communication system supportive of an unlicensed band and apparatus therefor.

Particularly, in case that a plurality of unlicensed component carriers are connected to a single user equipment by dual connectivity, the technical task of the present invention is to provide a channel access procedure of the user equipment (e.g., Listen Before Talk (LBT) method), Physical Downlink Control Channel (PDCCH) search space configuring method, and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present invention provides a method of transmitting an uplink signal to a base station by a user equipment in a wireless communication system supportive of an unlicensed band and apparatus therefor.

In one technical aspect of the present invention, provided herein is a method of transmitting an uplink signal through a plurality of unlicensed Component Carriers (CCs) including two or more unlicensed CCs belonging to different Timing Advance Groups (TAGs) by a user equipment in-a wireless communication system supportive of an unlicensed band, the method including determining a start point of a foremost subframe in a time domain with reference to a specific timing among subframes on a plurality of the unlicensed CCs as a transmission start point, performing a channel access procedure on a plurality of the unlicensed CCs with reference to the transmission start point, and depending on a success or failure of the channel access procedure, performing an uplink signal transmission on the plurality of the unlicensed CCs from the transmission start point or attempting the uplink signal transmission by determining a new transmission start point and performing a new channel access procedure with reference to the new transmission start point.

In another technical aspect of the present invention, provided herein is a user equipment in transmitting an uplink signal through a plurality of unlicensed Component Carriers (CCs) including two or more unlicensed CCs belonging to different Timing Advance Groups (TAGs) in a wireless communication system supportive of an unlicensed band, the user equipment including a transmitter, a receiver, and a processor configured to operate by being connected to the transmitter and the receiver, wherein the processor is further configured to determine a start point of a foremost subframe in a time domain with reference to a specific timing among subframes on a plurality of the unlicensed CCs as a transmission start point, perform a channel access procedure on a plurality of the unlicensed CCs with reference to the transmission start point, and depending on a success or failure of the channel access procedure, perform an uplink signal transmission on the plurality of the unlicensed CCs from the transmission start point or attempt the uplink signal transmission by determining a new transmission start point and performing a new channel access procedure with reference to the new transmission start point.

Preferably, the specific timing may include a timing for the user equipment to attempt an uplink signal transmission scheduled on the plurality of the unlicensed CCs or a timing for the user equipment to fail in the channel access procedure performed in advance for the uplink signal transmission scheduled on the plurality of the unlicensed CCs.

Preferably, the channel access procedure may include Listen Before Talk (LBT) for the plurality of the unlicensed CCs.

Preferably, if succeeding in the channel access procedure, the user equipment may perform the uplink signal transmission on the plurality of the unlicensed CCs from the transmission start point.

More preferably, the performing by the user equipment the uplink signal transmission on the plurality of the unlicensed CCs may include transmitting an initial signal from the transmission start point to a start point of a subframe per unlicensed CC and transmitting the uplink signal scheduled per unlicensed CC from the start point of the subframe per unlicensed CC after the transmission start point.

Here, the initial signal may include a signal configured in advance on a system or a portion or whole of the uplink signal to be transmitted thereafter.

Preferably, if failing in the channel access procedure, the user equipment may attempt the uplink signal transmission by determining the new transmission start point and performing the channel access procedure with reference to the new transmission start point.

More preferably, the attempting by the user equipment the uplink signal transmission by determining the new transmission start point and performing the channel access procedure with reference to the new transmission start point may further include determining a start point of a foremost subframe in the time domain with reference to a timing after the transmission start point among subframes on a plurality of the unlicensed CCs as the new transmission start point; and attempting the uplink signal transmission by performing the new channel access procedure on the plurality of the unlicensed CCs with reference to the new transmission start point.

Preferably, the user equipment may be connected to the two or more unlicensed CCs on a manner of a dual connectivity.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present invention have the following effects.

According to the present invention, although a plurality of unlicensed component carriers are connected through non-ideal backhaul, a user equipment performs a more efficient channel access procedure on a plurality of the unlicensed component carriers and is then able to perform an uplink signal transmission based on it.

Particularly, according to the present invention, in case that a plurality of unlicensed component carriers belonging to different TAGs exist, a signal transmission blocking effect in another U-cell, which is caused to a plurality of the unlicensed component carriers due to different UL timings, can be prevented.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 10 is a diagram illustrating an exemplary load based equipment (LBE) operation as one of the LBT operations.

BEST MODE FOR INVENTION

Figure 1:
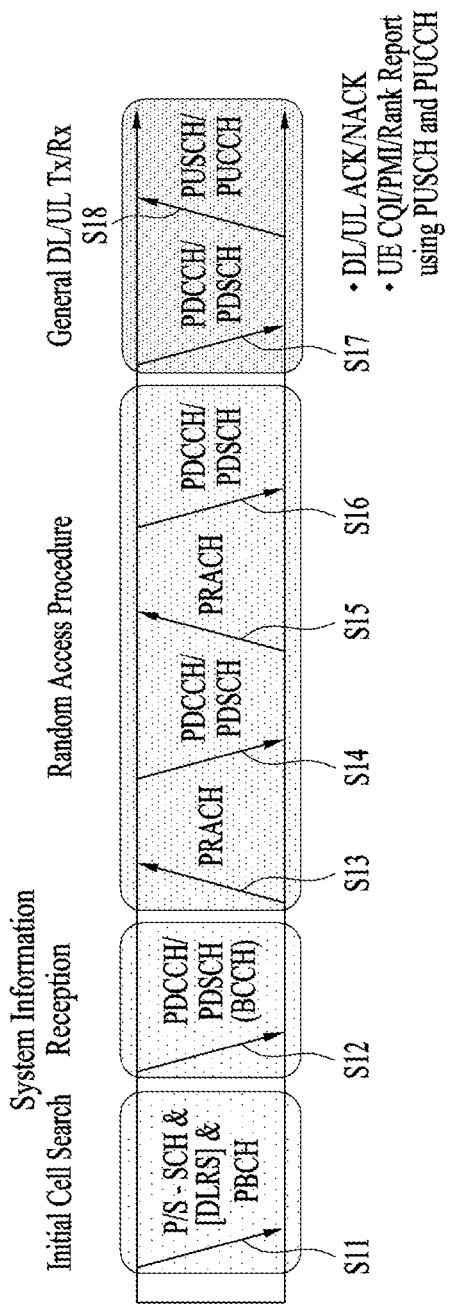
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels & Signal Transceiving Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
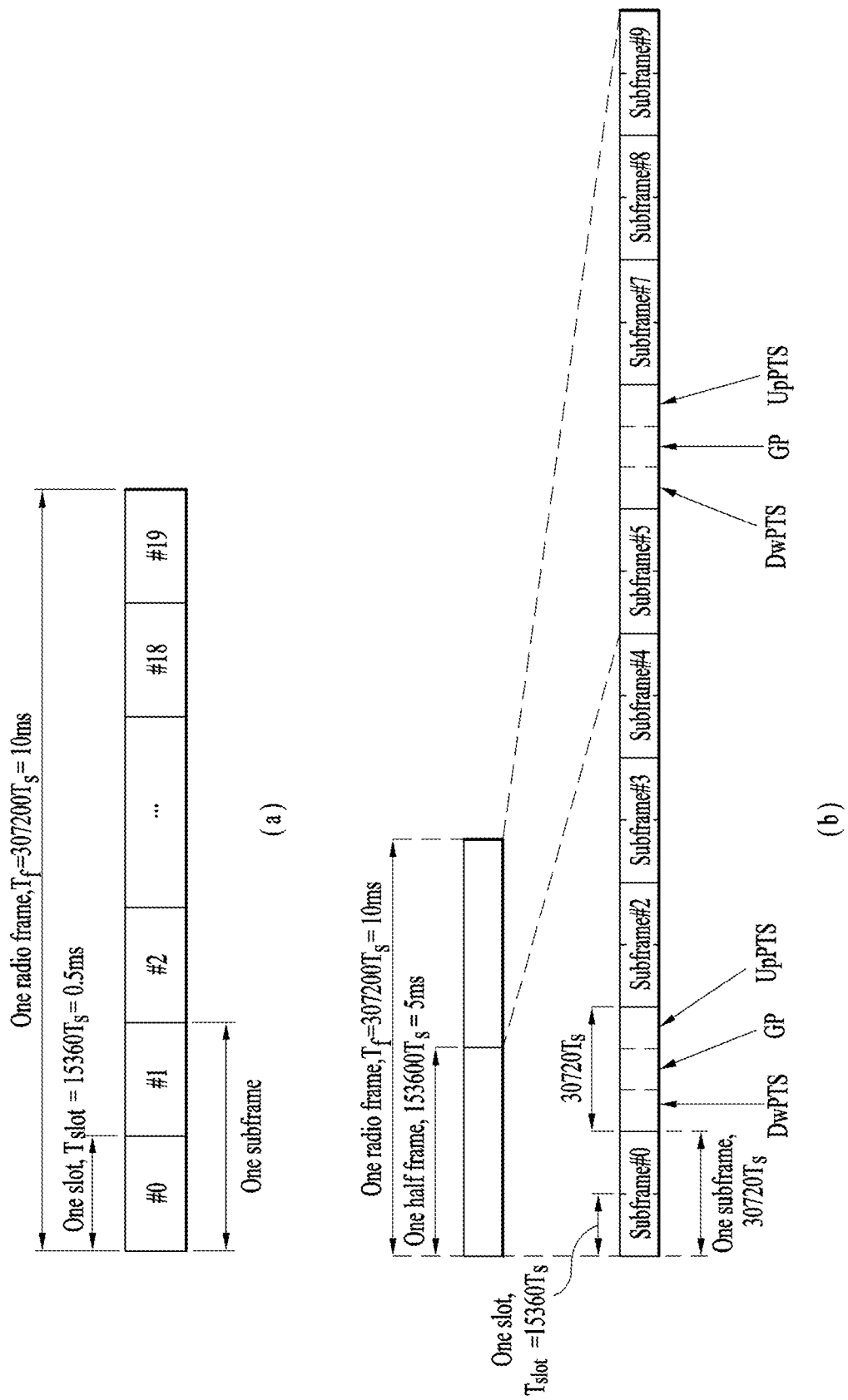
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| | | Normal cyclic prefix in downlink | | Extended cyclic prefix in downlink | | |
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |

TABLE 1-continued

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 7 | $21952 \cdot T_s$ | — | — | — | — | — |
| 8 | $24144 \cdot T_s$ | — | — | — | — | — |

Figure 3:
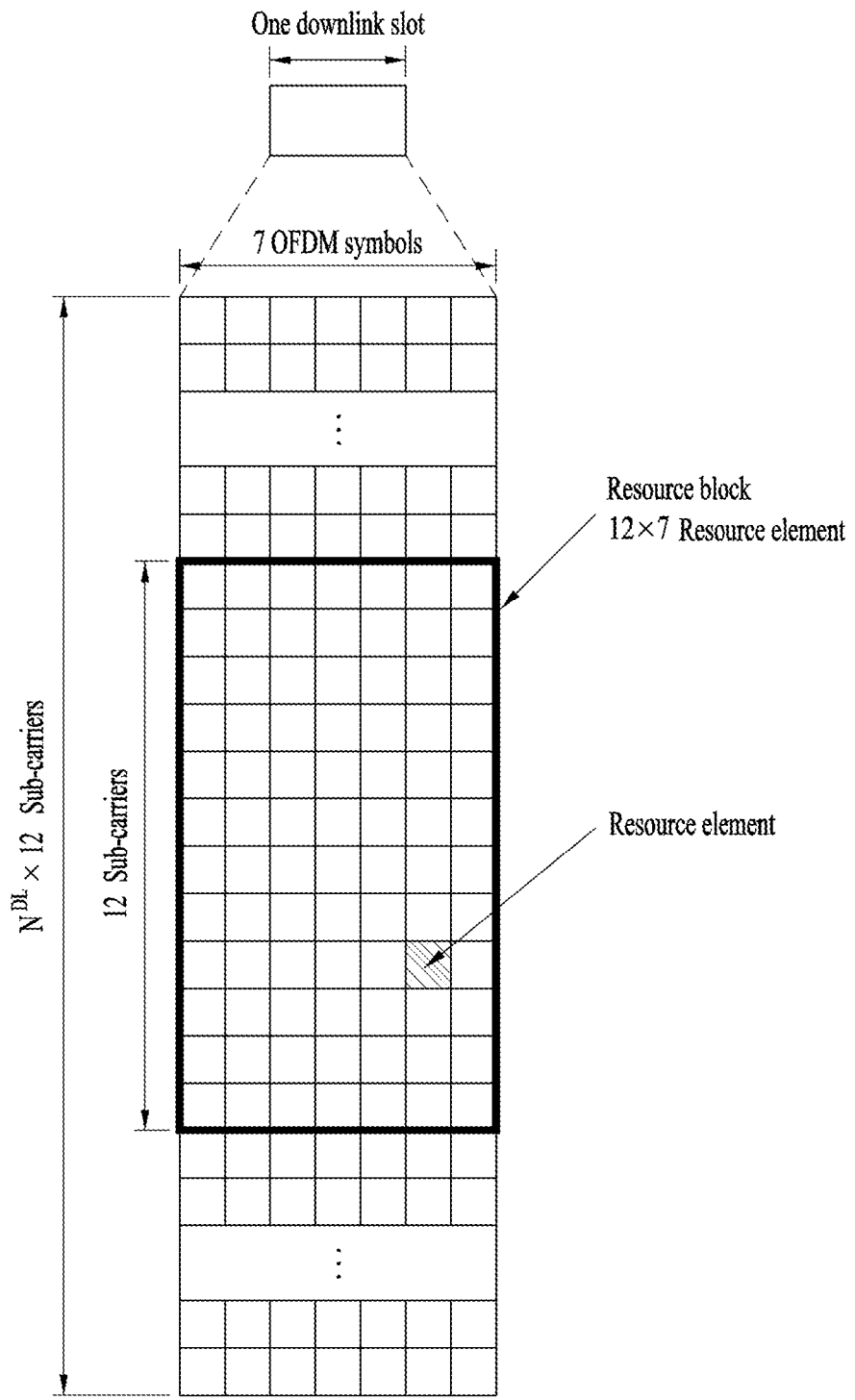
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
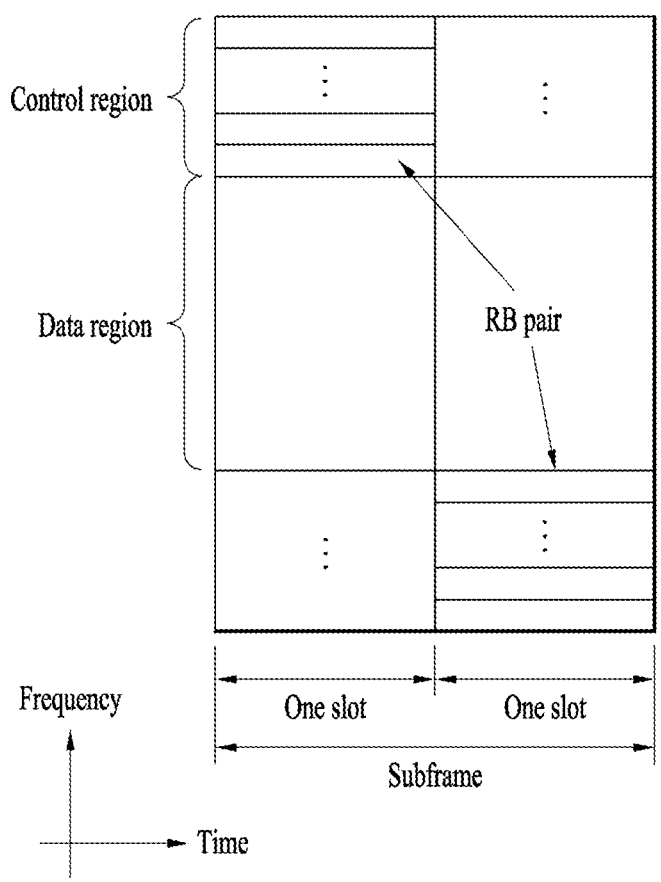
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
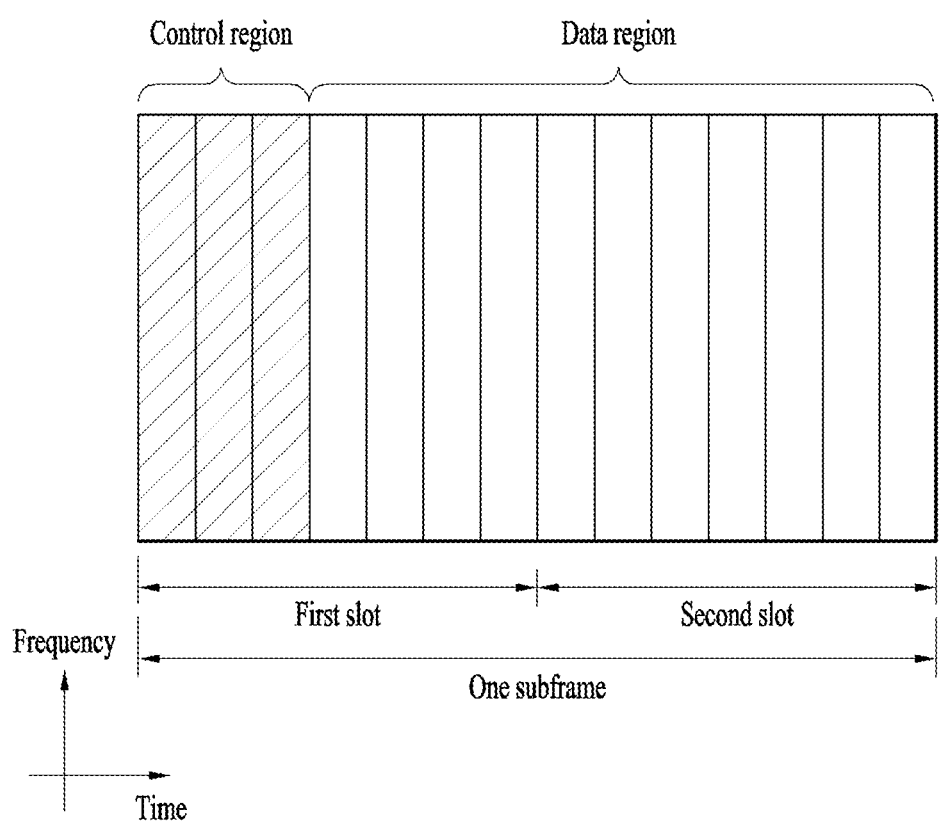
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. Dual Connectivity

Figure 6:
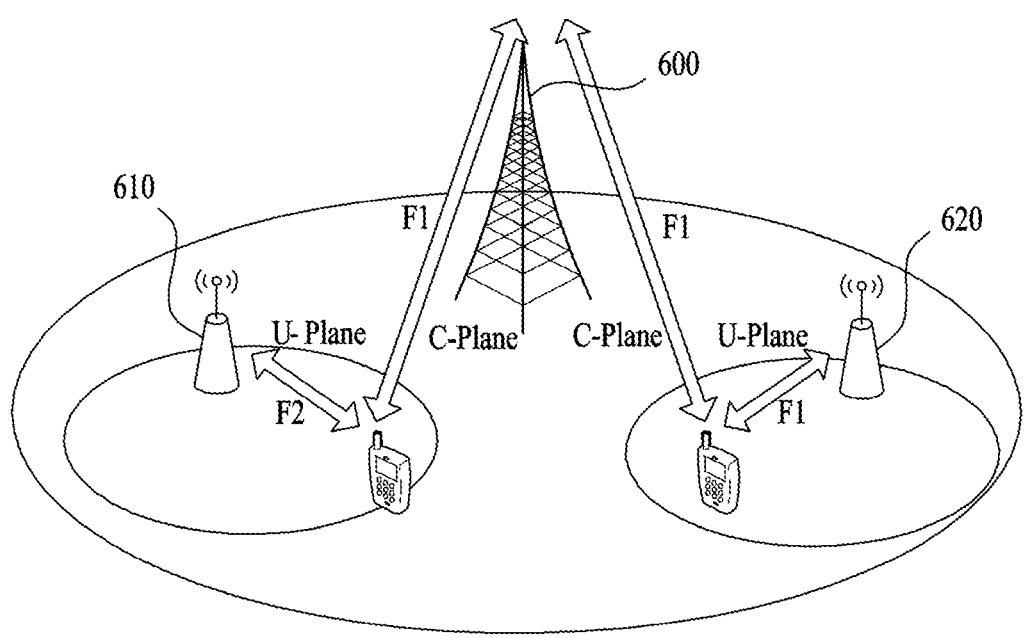
FIG. 6 is a diagram to describe the concept of dual connectivity usable for the present invention.

FIG. 6 is a diagram to describe the concept of dual connectivity usable for the present invention.

Referring to FIG. 6, carrier aggregation may be performed between a macro cell 610 and small cells 620 and 630. Namely, a macro cell may use n carriers (where n is an arbitrary positive integer) and a small cell may use k carriers (where k is an arbitrary positive integer). Here, carriers of the macro cell and carriers of the small cell may include the same random frequency carriers or the different random frequency carriers. For example, a macro cell may use random frequencies F1 and F2 and a small cell may use random frequencies F2 and F3.

A random User Equipment (UE) located within the small cell coverage may be simultaneously connected to a macro cell and a small cell and receive services from the macro cell and the small cell simultaneously or by Time Division Multiplexing (TDM). Through a macro cell layer, a function (e.g., connection management, mobility, etc.) provided in a control plane (C-plane) can be serviced. In case of a user plane (U-plane) data path, the macro cell, the small cell or the macro cell and the small cell may be selected. For example, in case of real-time data like Voice over LTE (VoLTE), transmission/reception can be performed through the macro cell that secures mobility better than the small cell. In case of a best effect service, a service can be received from the small cell. A connection between the macro cell and the small cell can be established through a backhaul. And, the backhaul may include an ideal backhaul or a nonideal backhaul.

Moreover, in case of the macro cell and the small cell, the same TDD or FDD systems may be configured or TDD and FDD systems may be configured.

The concept of dual connectivity may be observed from FIG. 6. It can be observed that the macro cell and the small cell use the same frequency band or different frequency bands. A random UE having dual connectivity configured therefor can be simultaneously connected to the macro cell and the small cell. FIG. 6 shows a case that a U-plane data path is configured with the small cell.

For clarity, the present invention mentions that a random UE configures dual connectivity with a macro cell and a small cell. Yet, the present invention is non-limited by cell types such as macro, micro, pico, femto and the like. Moreover, for clarity, it is described that a random dual-connectivity UE configures Carrier Aggregation (CA) by setting a macro cell and a small cell to a Primary cell (Pcell) and a Secondary cell (Scell), respectively. And, the present invention is non-limitedly applicable to other configurations.

Particularly, the present invention includes that a single UE configures dual connectivity to a Long Term Evolution (LTE) system based base station and an NR system based transmission reception point.

2. LTE-U System 2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 7:
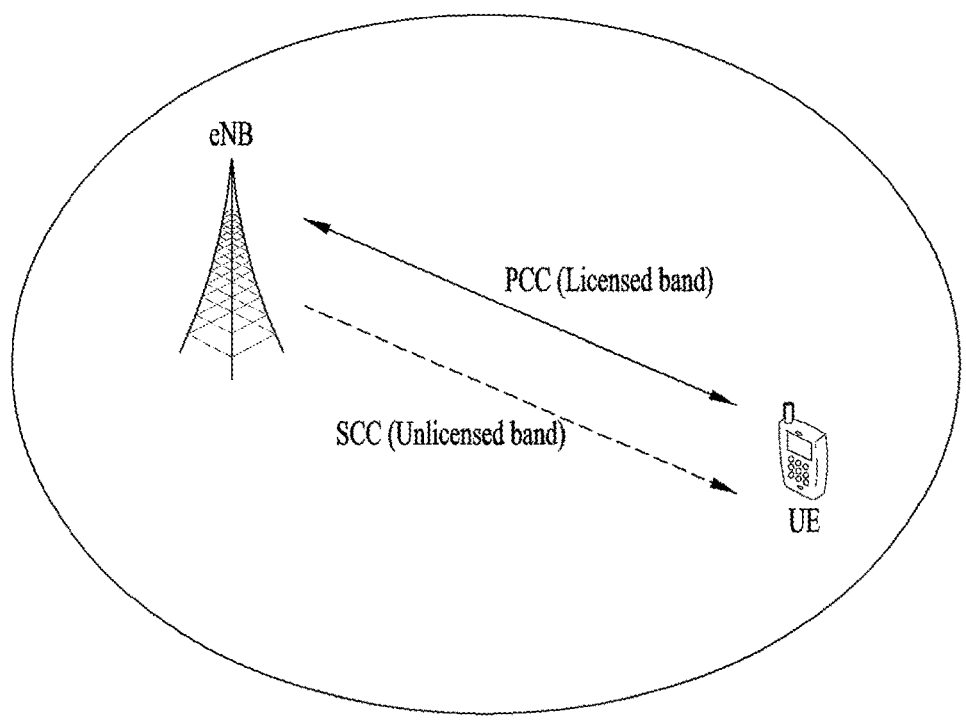
FIG. 7 is a diagram illustrating an exemplary carrier aggregation (CA) environment supported in a long term evolution-unlicensed (LTE-U) system.

FIG. 7 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 7, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 7 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 8:
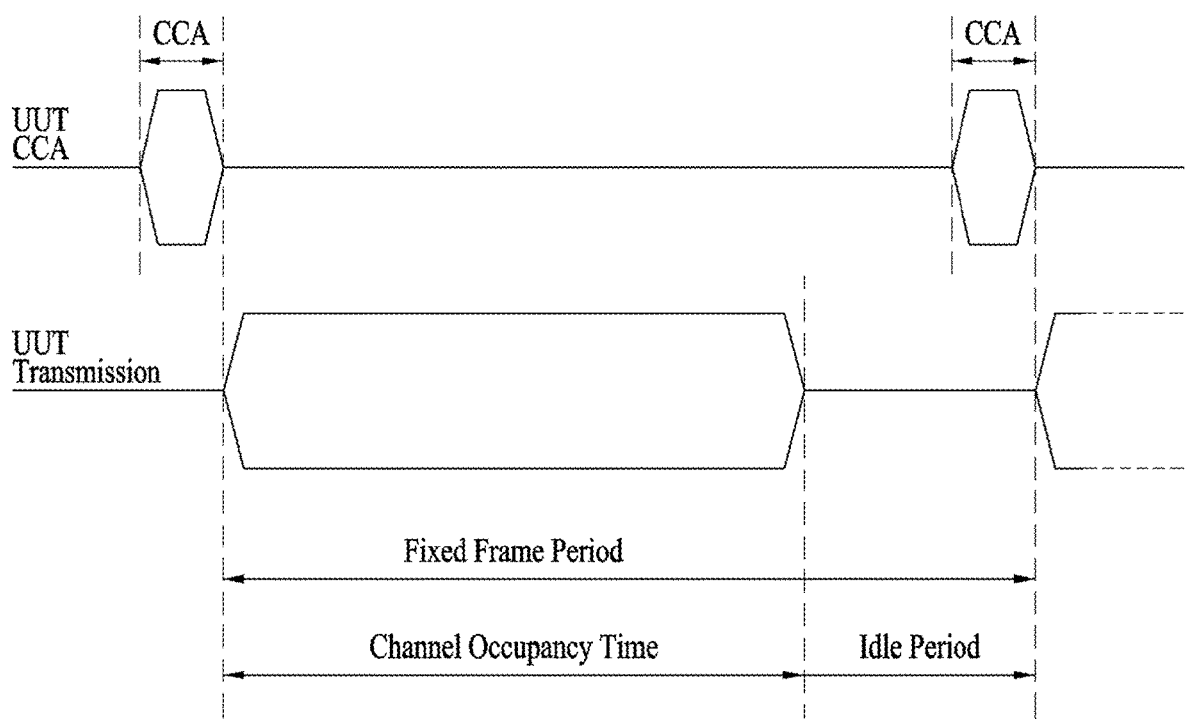
FIG. 8 is a diagram illustrating an exemplary frame based equipment (FBE) operation as one of listen-before-talk (LBT) operations.

FIG. 8 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period:

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 9:
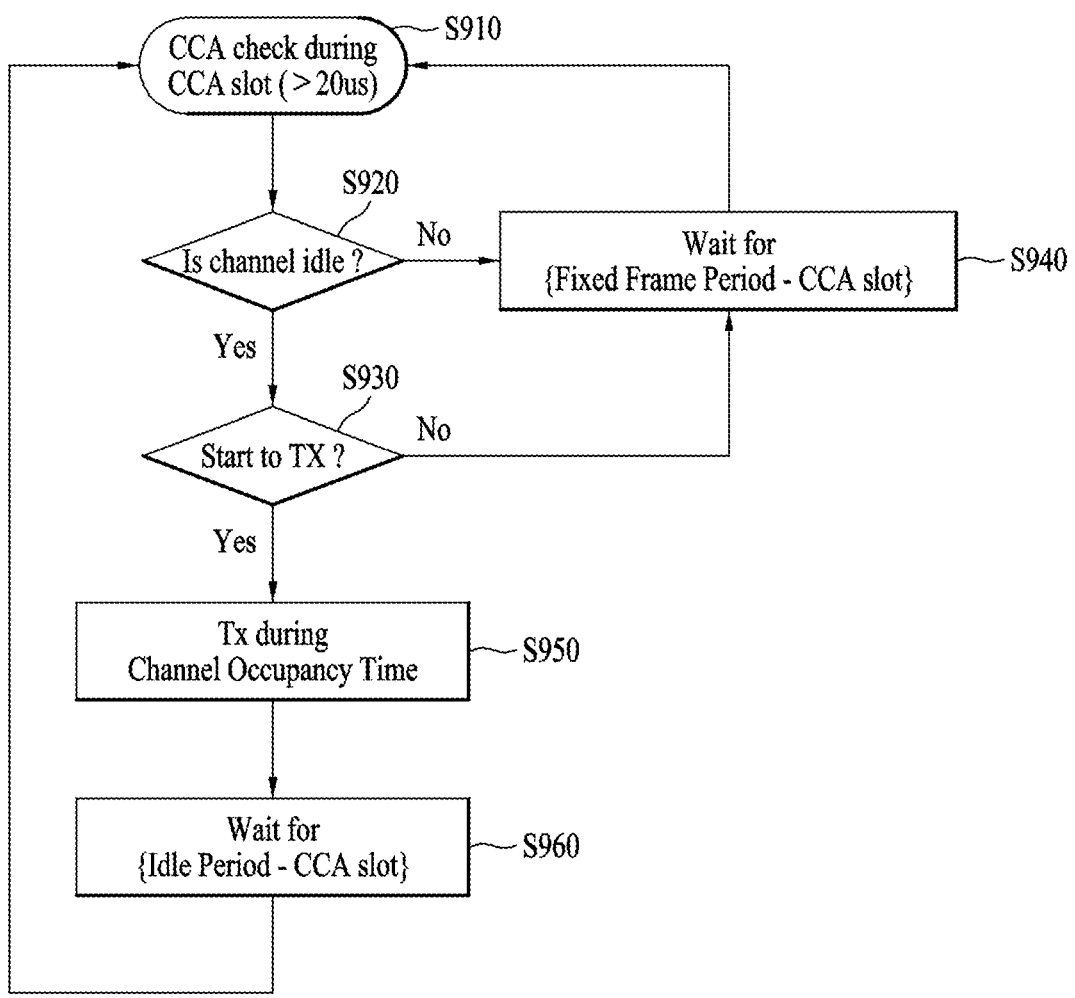
FIG. 9 is a block diagram illustrating the FBE operation.

FIG. 9 is a block diagram illustrating the FBE operation.

Referring to FIG. 9, a communication node (i.e., eNB) managing an SCell performs CCA during a CCA slot [S910]. If the channel is idle [S920], the communication node performs data transmission (Tx) [S930]. If the channel is busy, the communication node waits for a time period calculated by subtracting the CCA slot from a fixed frame period, and then resumes CCA [S940].

The communication node transmits data during the channel occupancy time [S950]. Upon completion of the data transmission, the communication node waits for a time period calculated by subtracting the CCA slot from the idle period [S960], and then resumes CCA [S910]. If the channel is idle but the communication node has no transmission data, the communication node waits for the time period calculated by subtracting the CCA slot from the fixed frame period [S940], and then resumes CCA [S910].

FIG. 10 is a view illustrating an exemplary LBE operation as one of the LBT operations.

Referring to FIG. 10($a$), in LBE, the communication node first sets q (q∈{4, 5, . . . , 32}) and then performs CCA during one CCA slot.

FIG. 10($b$) is a block diagram illustrating the LBE operation. The LBE operation will be described with reference to FIG. 10($b$).

The communication node may perform CCA during a CCA slot [S1010]. If the channel is unoccupied in a first CCA slot [S1020], the communication node may transmit data by securing a time period of up to (13/32)q ms [1030].

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms [S1040].

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 11:
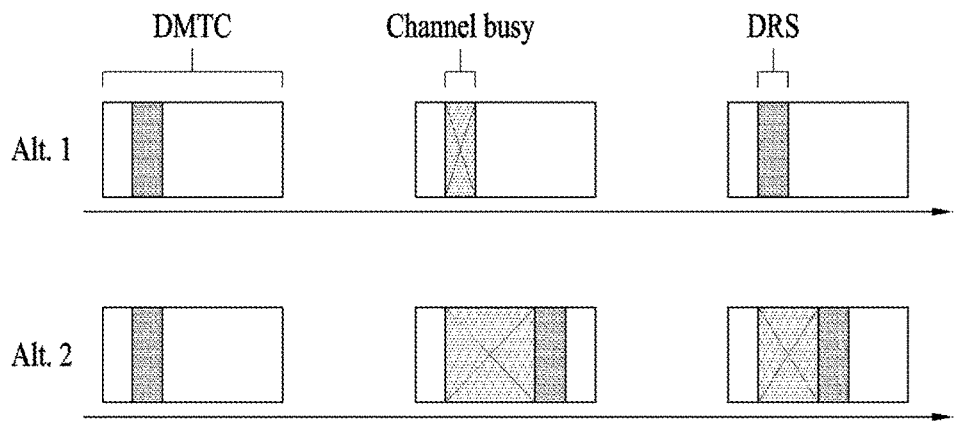
FIG. 11 is a diagram illustrating methods of transmitting a discovery reference signal (DRS) supported in a licensed assisted access (LAA) system.

FIG. 11 is a diagram for explaining DRS transmission methods supported by LAA system.

Referring to FIG. 11, the upper part of FIG. 11 shows the aforementioned first scheme for transmitting a DRS and the bottom part of FIG. 11 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 12:
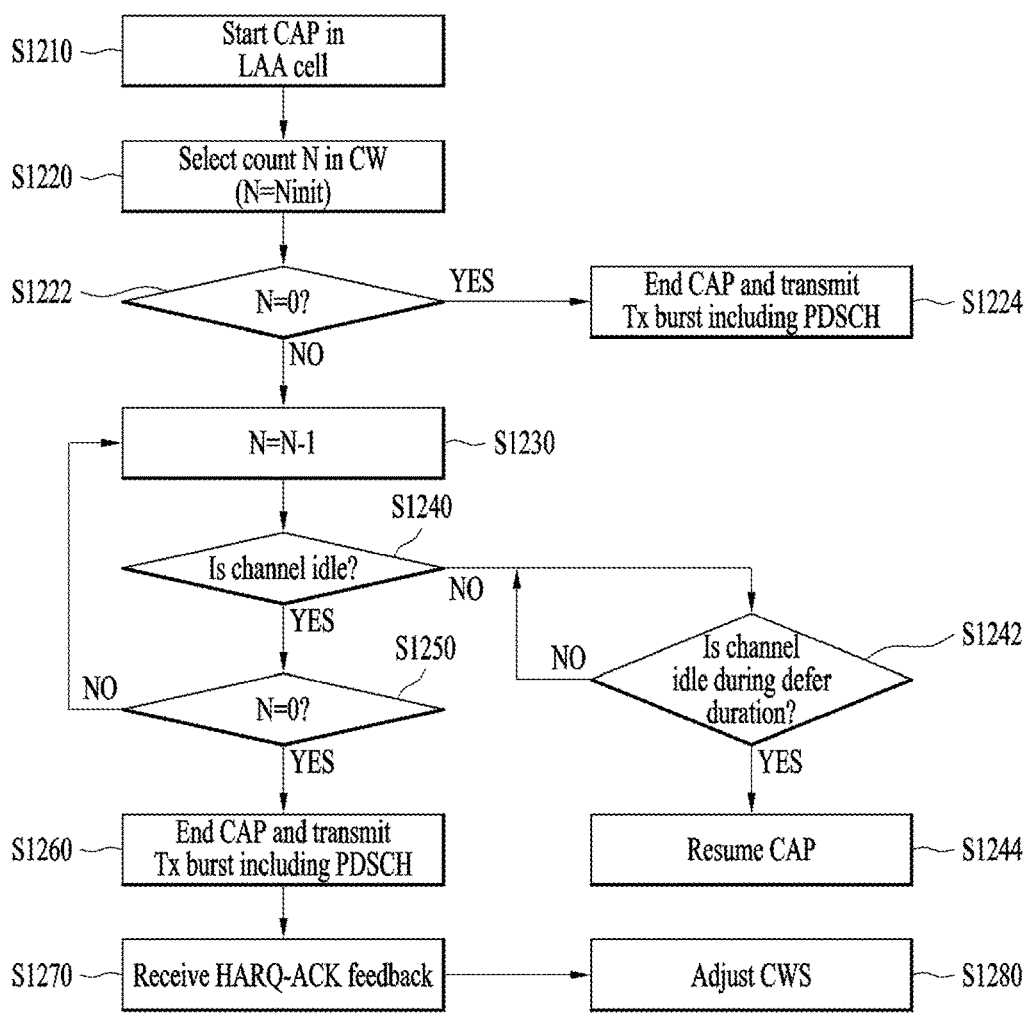
FIG. 12 is a diagram illustrating a channel access procedure (CAP) and contention window adjustment (CWA).

FIG. 12 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1210].

The base station can randomly select a back-off counter N from a contention window (CW). In this case, the N is configured by an initial value Ninit [S1220]. The Ninit is randomly selected from among values ranging from 0 to $CW_p$.

Subsequently, if the back-off counter value (N) corresponds to 0 [S1222], the base station terminates the CAP and performs Tx burst transmission including PSCH [S1224]. On the contrary, if the back-off value is not 0, the base station reduces the back-off counter value by 1 [S1230].

The base station checks whether or not a channel of the LAA Scell(s) is in an idle state [S1240]. If the channel is in the idle state, the base station checks whether or not the back-off value corresponds to 0 [S1250]. The base station repeatedly checks whether or not the channel is in the idle state until the back-off value becomes 0 while reducing the back-off counter value by 1.

In the step S1240, if the channel is not in the idle state i.e., if the channel is in a busy state, the base station checks whether or not the channel is in the idle state during a defer duration (more than 15 usec) longer than a slot duration (e.g., 9 usec) [S1242]. If the channel is in the idle state during the defer duration, the base station can resume the CAP [S1244]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1242 again to check whether or not the channel is in the idle state during a new defer duration.

Referring back to FIG. 12, the base station checks whether or not the back-off counter value (N) becomes 0 [S1250]. If the back-off counter value (N) becomes 0, the base station terminates the CAP and may be able to transmit a Tx burst including PDSCH.

The base station can receive HARQ-ACK information from a UE in response to the Tx burst [S1270]. The base station can adjust a CWS (contention window size) based on the HARQ-ACK information received from the UE [S1280].

In the step S1280, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1260, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

2.6. Channel Access Priory Class

TABLE 2

| Channel Access Priority Class (P) | $m_p$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

2.7. Subframe Structure Applicable to LAA System

Figure 13:
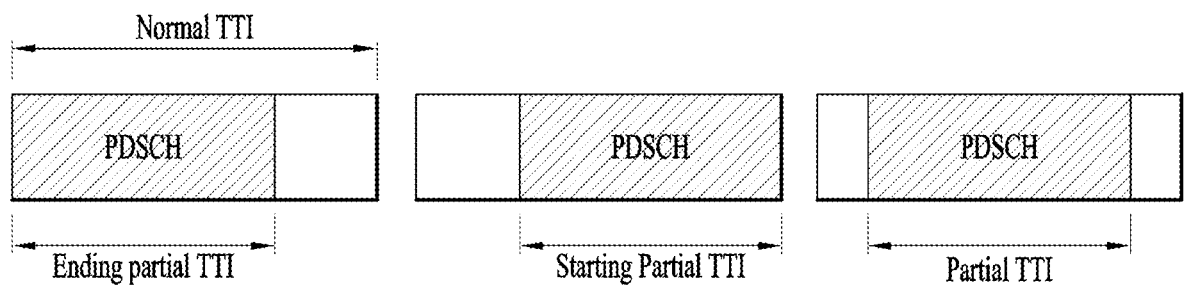
FIG. 13 is a diagram illustrating a partial transmission time interval (TTI) or a partial subframe, which is applicable to the present invention.

FIG. 13 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 13 illustrates various types of the aforementioned partial TTI. The first drawing of FIG. 13 illustrates an ending partial TTI (or subframe) and the second drawing illustrates a starting partial TTI (or subframe). The third drawing of FIG. 13 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 13, the present invention can also be identically applied to a UL operation. For example, a partial TTI structure shown in FIG. 13 can be applied to a form of transmitting PUCCH or PUSCH as well.

3. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as NewRAT or NR (New Radio).

3.1. Self-Contained Subframe Structure

Figure 14:
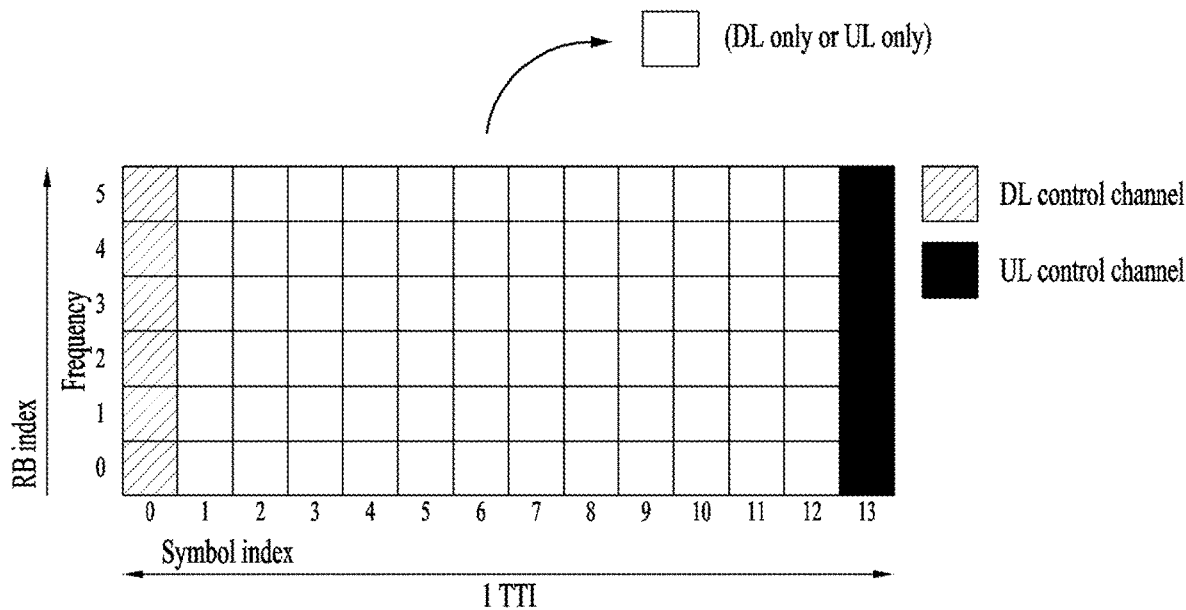
FIG. 14 is a diagram showing a self-contained subframe structure applicable to the present invention.

FIG. 14 is a diagram illustrating a self-contained subframe structure applicable to the present invention.

In the NR system to which the present invention is applicable, a self-contained subframe structure as shown in FIG. 14 is proposed in order to minimize data transmission latency in the TDD system.

In FIG. 14, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone, as shown in FIG. 14.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

3.2. OFDM Numerology

The NR system uses the OFDM transmission scheme or a similar transmission scheme. Here, the NR system may typically have the OFDM numerology as shown in Table 3.

TABLE 3

| Parameter | Value |
|---|---|
| Subcarrier-spacing (Δf) | 75 kHz |
| OFDM symbol length | 13.33 us |
| Cyclic Prefix (CP) length | 1.04 us/0.94 us |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme, and may use an OFDM numerology selected from among multiple OFDM numerologies as shown in Table 4. Specifically, as disclosed in Table 4, the NR system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 4 are merely an example that is applicable to the NR system according to the present invention, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 4 are merely an example that is applicable to the NR system according to the present invention, and the values thereof may depend on the implementation method.

TABLE 4

| Parameter | Value | Value | Value | Value |
|---|---|---|---|---|
| Subcarrier-spacing (Δf) | 15 kHz | 30 kHz | 60 kHz | 120 kHz |
| OFDM symbol length | 66.66 | 33.33 | 16.66 | 8.33 |

TABLE 4-continued

| Parameter | Value | Value | Value | Value |
|---|---|---|---|---|
| Cyclic Prefix (CP) length | 5.20 us/4.69 us | 2.60 us/2.34 us | 1.30 us/1.17 us | 0.65 us/0.59 us |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

3.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 15:
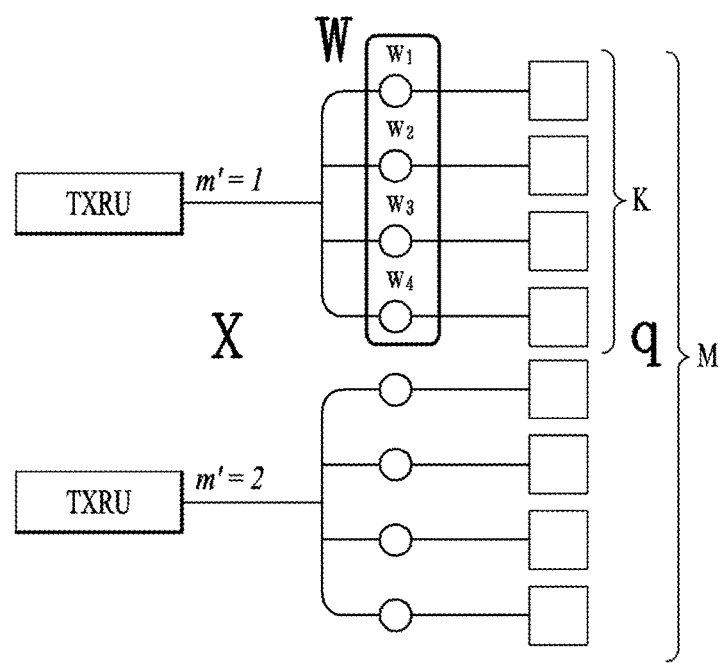
FIG. 15 and FIG. 16 are diagrams showing representative connectivity schemes of TXRU and antenna element.
Figure 16:
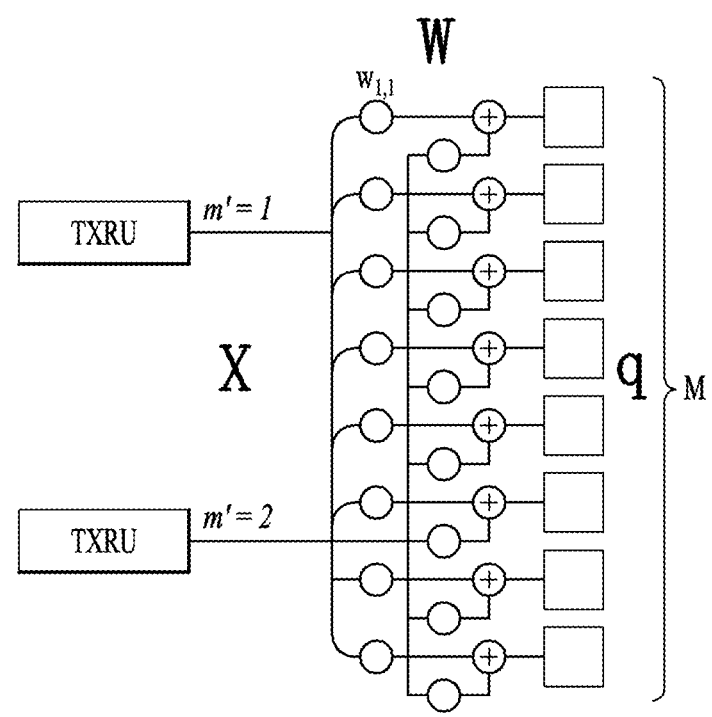

FIGS. 15 and 16 are diagrams illustrating representative methods for connecting TXRUs to antenna elements. Here, the TXRU virtualization model represents the relationship between TXRU output signals and antenna element output signals.

FIG. 15 shows a method for connecting TXRUs to sub-arrays. In FIG. 15, one antenna element is connected to one TXRU.

Meanwhile, FIG. 16 shows a method for connecting all TXRUs to all antenna elements. In FIG. 16, all antenna element are connected to all TXRUs. In this case, separate addition units are required to connect all antenna elements to all TXRUs as shown in FIG. 16.

In FIGS. 15 and 16, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 15 has a disadvantage in that it is difficult to achieve beamforming focusing but has an advantage in that all antennas can be configured at low cost.

On the contrary, the configuration shown in FIG. 16 is advantageous in that beamforming focusing can be easily achieved. However, since all antenna elements are connected to the TXRU, it has a disadvantage of high cost.

4. Proposed Embodiments

According to the present invention, operating methods of a base station/user equipment on an unlicensed band in a Dual Connectivity (hereinafter DC) situation (e.g., LBT method, PDCCH search space configuring method, etc.) are described in detail based on the above-described technology configurations.

Recently, for data offloading of an area of a hotspot (i.e., wireless LAN base station relaying a radio wave to use high-speed wireless internet), a small cell is introduced into a wireless communication system. Here, a UE can be associated with a macro cell having a large coverage for mobility management and additionally associated with a small cell for throughput enhancement.

In this case, if a backhaul between the macro cell and the small cell is ideal, the UE can receive services from both of the two cells through Carrier Aggregation (CA) that secures inter-cell synchronization within a predetermined level. Yet, due to the actual deployment, the macro cell and the small cell are geographically spaced apart from each other and may be connected to each other nonideally, whereby standardization of Dual Connectivity (DC) technology in LTE Release-12 system is in progress in consideration of such a situation.

Here, one of two eNBs connected together through a nonideal backhaul can be named a Master eNB (MeNB) and the other can be named a Secondary eNB (SeNB). In this case, a cell group administered by the MeNB is defined as a Master Cell Group (MCG) and a cell group adminstered by the SeNB is defined as a Secondary Cell Group (SCG). Moreover, for cells belonging to the MCG and cells belonging to the SCG, CA can be configured with a cell within each of the cell groups. A specific cell of the MCG can be configured as a Primary Cell (PCell) and a specific cell of the SCG can be configured as a Primary Secondary Cell (PSCell). In this case, PUCCH and contention-based PRACH may be allowed to be transmitted through the PCell and the PSCell.

Figure 17:
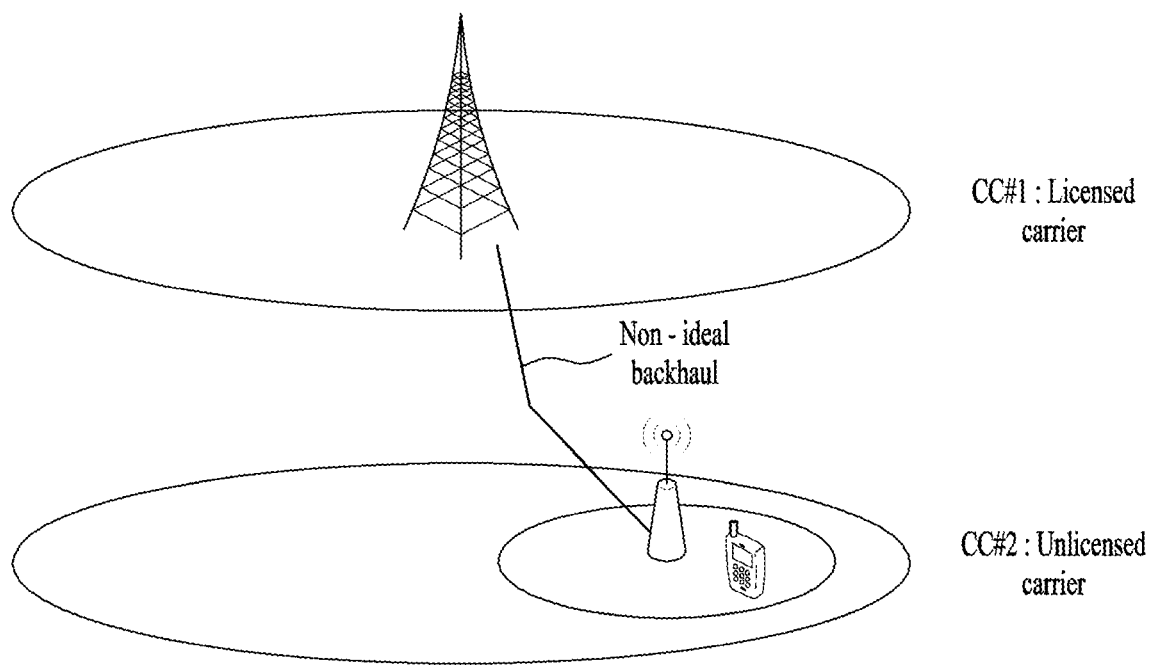
FIG. 17 and FIG. 18 are diagrams showing dual connectivity configurations including unlicensed component carriers applicable to the present invention.
Figure 18:
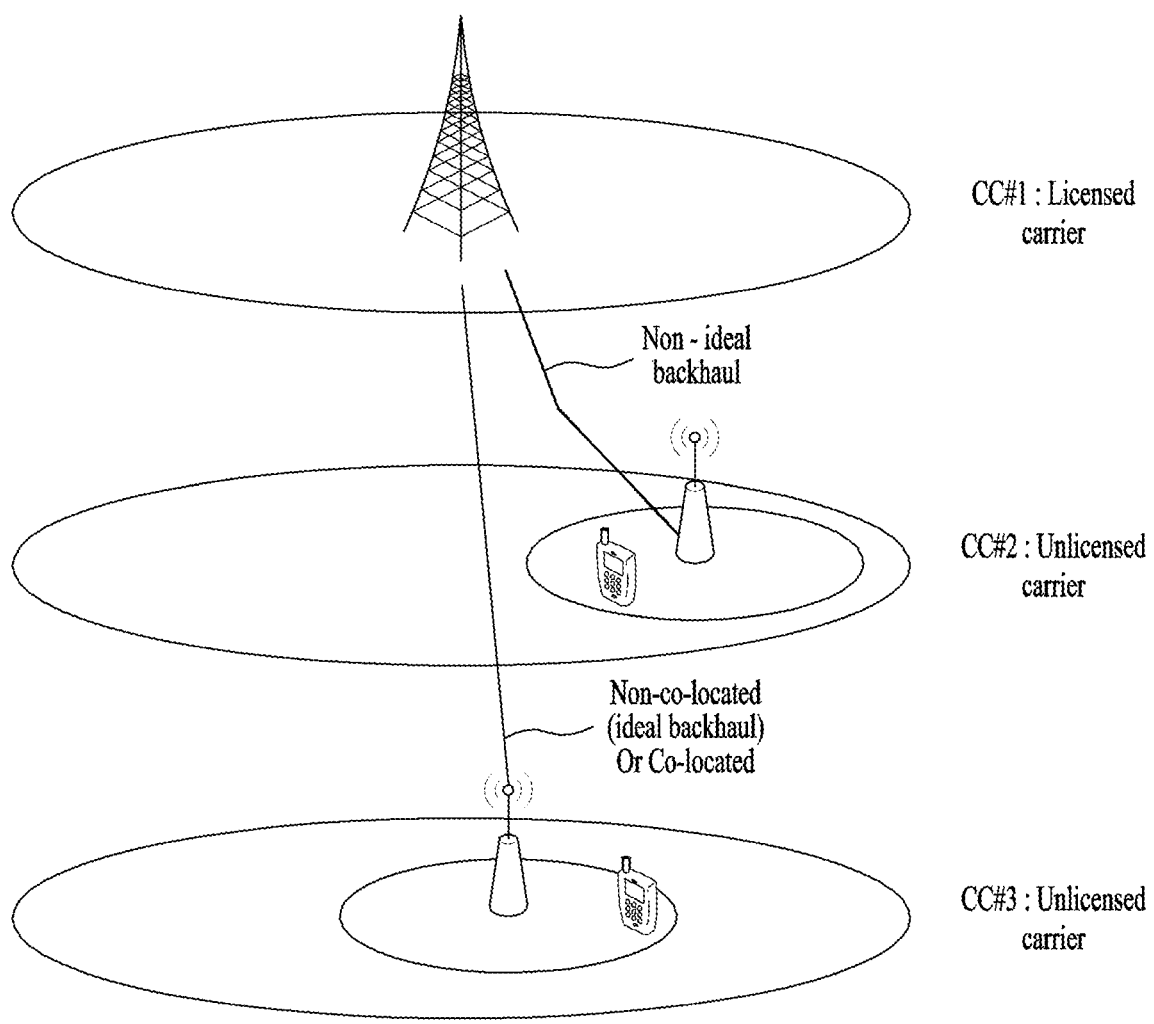

FIG. 17 and FIG. 18 are diagrams showing dual connectivity configurations including unlicensed component carriers applicable to the present invention.

Thus, as deployment scenarios for DC including unlicensed component carriers according to the present invention, two scenarios shown in FIG. 17 and FIG. 18 can be considered.

First of all, according to one example of the present invention, as shown in FIG. 17, it is able to consider a deployment scenario configured with MCG including Licensed cell (L-cell) and SCG including Unlicensed cell (U-cell) only. Secondly, according to another example of the present invention, as shown in FIG. 18, it is able to consider a deployment scenario configured with MCG including L-cell and U-cell and SCG including U-cell only.

Regarding the two scenarios, if U-cell is included in SCG only, specific U-cell in the SCG can be configured as PSCell. Yet, if L-cell(s) is included in SCG as well as U-cell, there may be limitation that only L-cell in the SCG can be configured as PSCell instead of U-cell.

Moreover, in case of FIG. 18, since U-cells typically belong to another group, they may belong to different Timing Advance Groups (TAGs) between U-cells. Or, different U-cells may belong to different TAGs due to a propagation delay difference according to an inter-cell geographical location despite not belonging to another CG.

Particularly, in case of FIG. 18, it may include a configuration that CC #1 and CC #3 are co-located. Hence, CC #2 and CC #3 may belong to different TAGs, respectively.

Therefore, according to the present invention, proposed is an unlicensed component carrier operating method (e.g., LBT method, PDCCH search space configuring method, etc.) in a dual connectivity situation. Particularly, the present invention non-limits wireless communication systems (e.g., LTE system, NR system, etc.) to which the corresponding technology is applicable, and the corresponding technology is applicable to all the various wireless communication systems. Hence, an eNB in the following technical configuration may be substituted with a new generation NodeB (gNB) of an NR system.

4.1 LBT Method

In UL transmissions on two U-cells belonging to different TAGs in aspect of a specific UE, a UL transmission to a specific U-cell may limit a UL transmission of another U-cell due to different UL timings.

Figure 19:
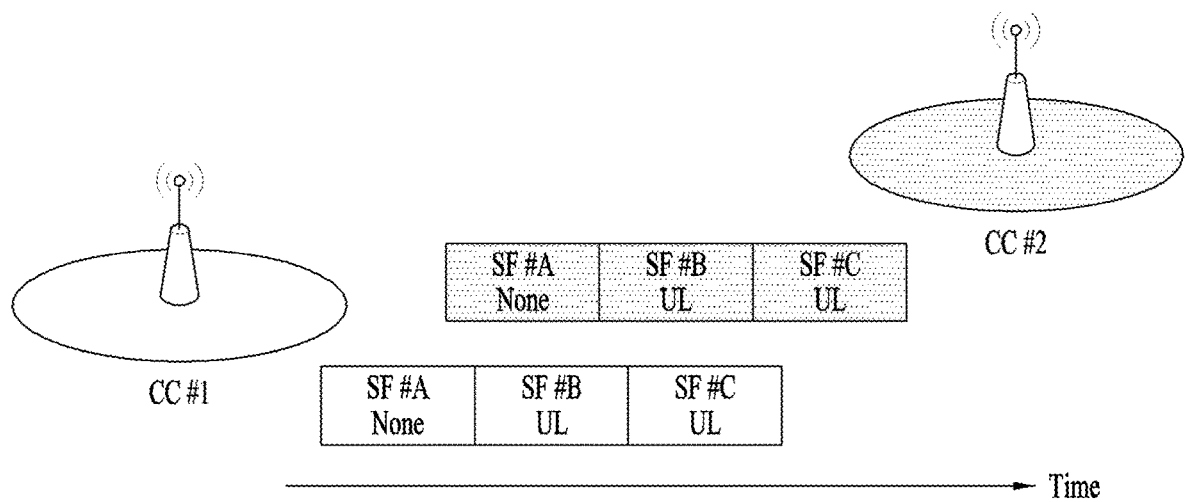
FIG. 19 is a diagram schematically showing a subframe structure per cell in aspect of a specific UE for two cells belonging to different TAGs.

FIG. 19 is a diagram schematically showing a subframe structure per cell in aspect of a specific UE for two cells belonging to different TAGs.

Referring to FIG. 19, a UE is communicating with unlicensed component carriers CC #1 and CC #2. And, the CC #1 and CC #2 may be configured to belong to different TAGs, respectively. Here, as the UE succeeds in LBT for a UL transmission in SF #B, if the UE starts a UL transmission from a subframe boundary of the SF #B, since the UE becomes unable to attempt LBT for a UL transmission in SF #2 (due to single Radio Frequency (RF) implementation or self-interference), the UE may not be able to perform the UL transmission in SF #2.

To solve such a problem, the present invention proposes a following method. First of all, transmission start points of SF #2 and SF #B are adjusted (aligned) into the same timing (with reference to CC #1). If a UE succeeds in LBT at the corresponding timing, the UE starts a UL transmission scheduled in SF #B, transmits an initial signal between the corresponding timing and a transmission start point of SF #2, and then starts a scheduled UL transmission from the transmission start point of SF #2.

Here, the initial signal may include a preset signal (e.g., DeModulation Reference Signal (DM-RS), Sounding Reference Signal (SRS), etc.) or a copy of a UL signal to be transmitted in a next subframe on a corresponding unlicensed component carrier.

Additionally, according to the present invention, when a UE adjusts a transmission start point and performs LBT, a CC that becomes a reference of the transmission start point may be changed depending on cases. For example, if a UE fails in LBT for SF #B in the example of FIG. 19, the UE may adjust transmission start points of SF #2 and SF #C with reference to CC #2 and then perform LBT.

Additionally, an LBT method applicable to DL transmission of an eNB is described as follows.

When an eNB performs a DL transmission on U-cell that is PSCell, Random Access Response [RAR, i.e., PDCCH Cyclic Redundancy Check (CRC) scrambled with Random Access-Radio Network Temporary Identifier (RA-RNTI) and PDSCH including RAR Medium Access Control (MAC) Control Element (CE) corresponding thereto] and/or Transmit Power Control (TPC) command (i.e., PDCCH CRC scrambled with TPC-PUSCH-RNTI and/or TPC-PUCCH-RNTI) may be included in the corresponding DL transmission only. Here, as an LBT method performed by the eNB before performing the corresponding DL transmission, a rule may be configured in a manner that CCA based LBT for a predetermined time interval (e.g., 25 μsec) (or transmission without LBT) is applied instead of category-4 based LBT (i.e., random backoff based LBT or channel access procedure for DL transmission including PDSCH).

Or, when an eNB performs a DL transmission on U-cell that is PSCell, if RAR and/or TPC command is included in the corresponding DL transmission only, although category-4 based LBT is set as an LBT method performed by the eNB before performing the corresponding DL transmission, the eNB can perform LBT using LBT parameters corresponding to a specific channel access priority class (e.g., priority class 1). So to speak, when an eNB performs DL transmission on U-cell that is PSCell, if RAR and/or TPC command is included in the corresponding DL transmission only, the corresponding eNB can be configured to perform LBT using LBT parameters corresponding to a prescribed one (e.g., priority class 1) of a plurality of channel access priority classes. Here, the prescribed channel access priority class may be set in advance or by separate signaling.

4.2. PDCCH Search Space Configuring Method

According to TS 36.123 spec. document of LTE Release-14 system, the number of PDCCH Blind Decoding (BD) candidates a UE should monitor is defined as the following table.

TABLE 5

| Search space $S_k^{(L)}$ | | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Particularly, when PDCCH is transmitted on U-cell that is PSCell, in order for a UE to receive the PDCCH correctly, in case of U-cell that is the PSCell, it is necessary to configure a common search space. In this case, the PDCCH candidate numbers for Aggregation Levels (ALs) 4 and 8 are 4 and 2, respectively. Since the UE should perform BD on each of DCI format 1A and DCI format 1C, the UE should perform BDs as many as total [(4+2)*2] times.

In addition thereto, in LTE Release-13 LAA system, Common PDCCH (C-PDCCH) (here, the C-PDCCH is CRC scrambled with CC-RNTI) is additionally introduced for the purpose of indicating a next subframe or the number of OFDM symbols configuring the next subframe. Here, the common PDCCH may have the same size of DCI format 1C and include one of aggregation level 4 and aggregation level 8. Moreover, for the common PDCCH, Control Channel Element (CCE) index is fixed to 0~3 or 0~7. A region carrying the corresponding PDCCH is identical to a first PDCCH candidate of AL 4/8 of a common search space.

Accordingly, in case of configuring a PDCCH search space for U-cell that is PSCell, it is necessary to consider a search space corresponding to the C-PDCCH in addition to a search space defined in the existing LTE system. Therefore, the present invention proposes a method of configuring a PDCCH search space according to the introduction of the C-PDCCH.

4.2.1. First PDCCH Search Space Configuring Method

As a method of making it equal to L-cell P(S)Cell in aspect of PDCCH BD count for a common search space, it is able to decrease the PDCCH BD number for a common search space of U-cell PSCell in consideration of C-PDCCH having the same size of DCI format 1C. For example, it is able to reduce the PDCCH BD number corresponding to AL 4/8 of a common search space to 3/1. Or, while the PDCCH BD number corresponding to DCI format 1A in the PDCCH BD number corresponding to AL 4/8 of the common search space is maintained as 4/2, the PDCCH BD number corresponding to DCI format 1C can be reduced to 3/1.

4.2.2. Second PDCCH Search Space Configuring Method

As another method, a method of configuring a common search space differently is proposed. The corresponding method can solve a problem that the number of PDCCH candidates transmittable on a common search space is reduced due to the blocking of C-PDCCH transmission.

Here, an offset value, which is set in advance (or by higher layer signaling or L1 signaling) is applicable between a start CCE index of C-PDCCH and a CCE index of a common search space.

For example, in case of AL 4, C-PDCCH may be configured with CCE index #0/1/2/3 and a CCE index of a common search space may be configured with #4/5/6/7, #8/9/10/11, #12/13/14/15, and #16/17/18/19.

In addition, the second PDCCH search space configuring method may additionally include the aforementioned first PDCCH search space configuring method. Namely, the PDCCH BD number corresponding to AL 4/8 of a common search space can be reduced to 3/1 and an offset value, which is set in advance (or by higher layer signaling or L1 signaling), is also applicable between a start CCE index of C-PDCCH and a CCE index of the common search space.

For example, in case of AL 4, C-PDCCH may be configured with CCE index #0/1/2/3 and a CCE index of a common search space may be configured with #4/5/6/7, #8/9/10/11, and #12/13/14/15.

4.2.3. Third PDCCH Search Space Configuring Method

As another method, considering that a transmission opportunity of RAR, TPC command of the like that will be transmitted through a common search space (transmitted on PSCell of an existing LTE system) due to C-PDCCH transmission, the PDCCH BD number in a common search space may be increased. So to speak, a method of increasing a search space for performing PDCCH BD on a common search space is proposed.

For example, it is able to increase the PDCCH BD number corresponding to AL 4/8 of a common search space to 5/3.

Or, while the PDCCH BD number corresponding to DCI format 1A in the PDCCH BD number corresponding to AL 4/8 of the common search space is maintained as 4/2, the PDCCH BD number corresponding to DCI format 1C can be increased to 5/3.

Additionally, in LTE Release-14 eLAA system, new DCI format 0A/0B/4A/4B is introduced instead of DCI format 0/4. Here, DCI format 0A/0B can be used for the usage of 1 Transmission Block (TB) scheduling and DCI format 4A/4B can be used for the usage of 2 TB scheduling. DCI format 0A/4A can be utilized for the usage of scheduling a single UL subframe only and DCI format 0B/4B can be utilized for the usage of scheduling up to maximum 4 UL subframes at a time.

Here, DCI format 0A/0B/4A/4B (or, some of them) can be transmitted through the common search space. Typically, among the DCI formats for the UL scheduling, DCI format 1A and/or DCI format having the same size of DCI format 1C may allowed to be transmitted through the common search space.

4.3. Half Duplex Operation

As shown in FIG. 18, in case that CC #2 that is U-cell belongs to SCG and CC #3 that is U-cell belongs to MCG, it is assumed that there exists a UE for which CC #3 and CC #2 are configured. Here, considering nonideal backhaul connection between an SeNB administering CC #2 and an MeNB administering CC #2, if DL/UL configuration information per subframe is not shared between eNBs, it may cause a problem.

Figure 20:
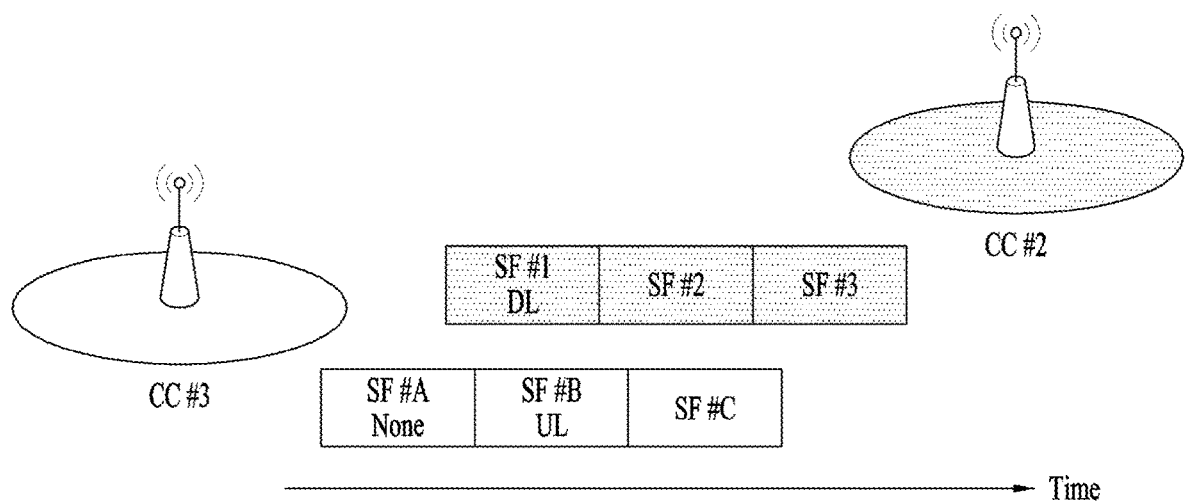
FIG. 20 is a diagram schematically showing a case that a boundary of DL/UL subframe structure for different cells is not aligned.

FIG. 20 is a diagram schematically showing a case that a boundary of DL/UL subframe structure for different cells is not aligned.

First of all, regarding a frame structure type 3 introduced for U-cell, unlike Time Division Duplex (TDD) having the existing frame structure type applied thereto, DL/UL configuration in a radio frame unit is not configured by Radio Resource Control (RRC) signaling (or cell-common L1 signaling) but DL/UL configuration is determined dynamically according to the scheduling of eNB.

Moreover, the typical UE implementation of 5-GHz unlicensed band follows the single RF based implementation. Hence, it is difficult for an MeNB to be aware of DL/UL configuration of CC #2 and it is difficult for an SeNB to be aware of DL/UL configuration of CC #3. Here, for two subframes (e.g., SF #1 and SF #B in FIG. 20) having an overlapping subframe boundary inbetween in aspect of a corresponding UE, if a DL reception is scheduled for one (e.g., SF #1) and a UL transmission is scheduled for the other (e.g., SF #B), one (e.g., SF #B, because the DL reception from SF #1 is already in progress) of the two subframes cannot follow the scheduling information.

To solve such a problem, DL/UL subframe configuration information of each eNB can be transceived between the MeNB and the SeNB (by higher layer signaling). Here, the DL/UL subframe configuration information may include per-subframe DL/UL(/none) and/or subframe length information of each eNB in a specific time unit (e.g., 10 msec).

In this case, UL information included in the DL/UL subframe configuration information may include up to information indicating which UE is actually scheduled.

Or, the DL/UL subframe configuration information may be configured in a manner of not including DL scheduling information but including UL scheduling information. In this case, the DL/UL subframe configuration information may also include up to information indicating which UE is actually scheduled.

Hence, DL scheduling may be regarded as available for a subframe not indicated by UL scheduling of another eNB. Or, although UL scheduling of another eNB for a specific subframe is indicated, DL scheduling may be regarded as available for the corresponding subframe with respect to an actually unscheduled UE.

Figure 21:
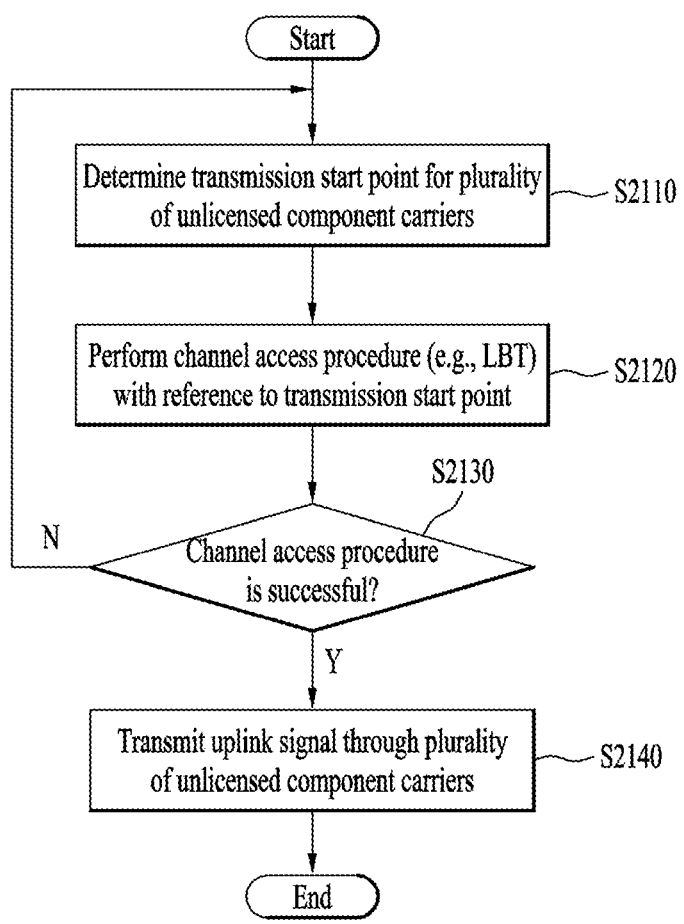
FIG. 21 is a diagram showing configuration of a UE and base station for implementing the proposed embodiments.

FIG. 21 is a diagram showing configuration of a UE and base station for implementing the proposed embodiments.

Referring to FIG. 21, a UE according to the present invention can perform the following method to transmit an uplink signal through a plurality of unlicensed Component Carriers (CCs) including two or more unlicensed CCs belonging to different TAGs (or TAGs having different TA values).

First of all, the UE determines a start point of a foremost subframe in a time domain with reference to a specific timing among subframes on a plurality of the unlicensed CCs as a transmission start point [S2110].

For example, in FIG. 19, if a UE attempts a UL transmission in SF #B of CC #1 of U-cell and SF #2 of CC #2, the UE can determine a start point of a foremost subframe (e.g., SF #B in FIG. 19) in a time dimension among subframes on a plurality of unlicensed CCs with reference to a timing of attempting the UL transmission as a transmission start point.

Thus, the specific timing may include a timing at which the UE attempts a scheduled UL signal transmission on a plurality of the unlicensed CCs.

Subsequently, the UE performs a channel access procedure (e.g., LBT) on a plurality of the unlicensed CCs with reference to the transmission start point [S2120].

In doing so, depending on a success or failure in the channel access procedure of the UE [S2130]. A next operation of the UE may vary. Particularly, depending on the success or failure in the channel access procedure, the UE may perform a UL signal transmission on a plurality of the unlicensed CCs from the transmission start point [S2410] or newly perform an operation according to the steps S2110 to S2130.

Thus, if the UE performs the operation again according to the steps S2110 to S2130 depending on the success or failure of the channel access procedure in the step S21320, the aforementioned specific timing may include a timing at which the UE fails in a channel access procedure performed in advance for the scheduled UL signal transmission on a plurality of the unlicensed CCs.

In a step S2140, the UE may transmit a UL signal on a plurality of the unlicensed CCs from a transmission start point corresponding to the successful channel access procedure.

Particularly, in the step S2140, the UE may transmit an initial signal from the transmission start point to a start point of a subframe per unlicensed CC and then transmit a UL signal scheduled per unlicensed CC from the start point of the subframe per unlicensed CC after the transmission start point.

For example in detail, if the UE succeeds in the channel access procedure for the SF #B of FIG. 19 in the step S2130, the UE may transmit UL signals on CC #1 and CC #2 with reference to the start point of the SF #B by different methods, respectively.

First of all, in case of CC #1, since the transmission start point corresponding to the successful channel access procedure matches the start point of SF #B, the UE can transmit a UL signal scheduled for the CC #1 from the start point (or the transmission start point) of the SF #B. On the other hand, in case of CC #2, since the transmission start point corresponding to the successful channel access procedure is ahead of the start point of SF #2, the UE may transmit an initial signal on CC #2 from the transmission start point to the start point of the SF #2 and then transmit a UL signal scheduled for the CC #2 on the CC #2 after the start point of the SF #2.

In doing so, the initial signal may include a signal configured in advance on a system or a portion or whole of a UL signal to be transmitted thereafter. According to one example shown in FIG. 19, the initial signal may include a portion or whole of a UL signal scheduled in SF #3 on CC #2 or a signal configured in advance on a system.

According to the present invention, two or more unlicensed CCs belonging to different TAGs may be connected to the UE on a manner of (or by) dual connectivity.

As examples of the above-described proposed methods can be included in the implementing methods of the present invention, they can be obviously regarded as a sort of proposed methods. Moreover, although the above-described proposed methods can be implemented independently, they may be implemented in a manner of combination (or aggregation) of some proposed methods. And, a rule may be defined in a manner that a base station informs a user equipment whether the proposed methods are applied (or information on rules of the proposed methods) through a predefined signal (e.g., physical layer signal or higher layer signal).

5. Device Configuration

Figure 22:
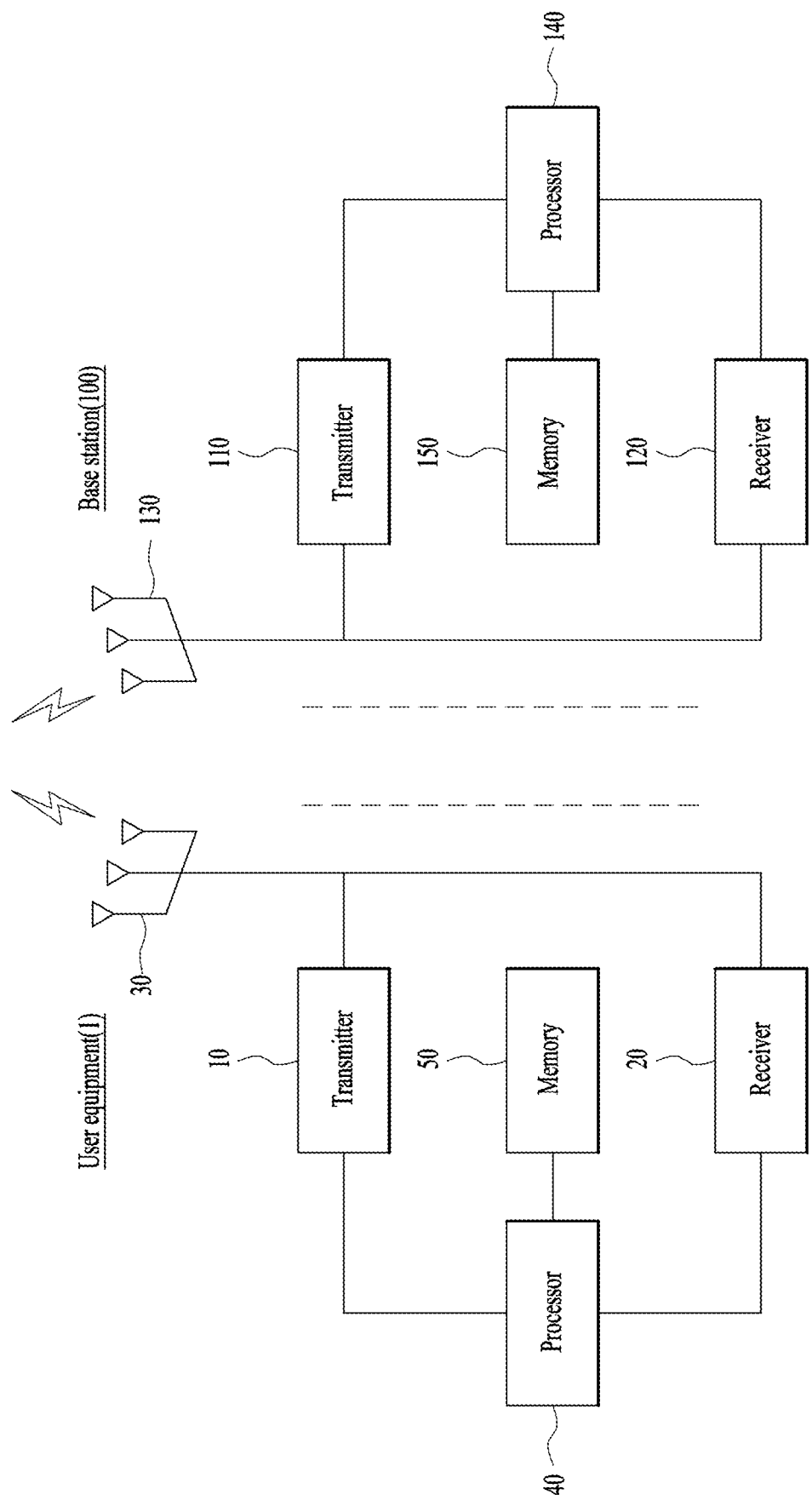
FIG. 22 is a diagram illustrating configurations of a UE and a base station capable of being implemented by the embodiments proposed in the present invention.

FIG. 22 is a diagram illustrating configurations of a UE and a base station capable of being implemented by the embodiments proposed in the present invention. The UE shown in FIG. 22 operate to implement the embodiments of the method for transmitting an uplink signal.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The above-configured UE 1 can transmit a UL signal through a plurality of unlicensed Component Carriers (CCs) including two or more unlicensed CCs belonging to different Timing Advance Groups (TAGs), respectively.

As a method for this, the UE determines a start point of a foremost subframe in a time domain with reference to a specific timing among subframes on a plurality of the unlicensed CCs as a transmission start point through the processor 40. Subsequently, the UE 1 performs a channel access procedure on a plurality of the unlicensed CCs with reference to the transmission start point through the processor 40 that controls the transmitter 10 and the receiver 20. Subsequently, depending on a success or failure in the channel access procedure, the UE 1 perform a UL signal transmission on a plurality of the unlicensed CCs from the transmission start point through the transmitter 10 or attempts the UL Signal transmission by determining a new transmission start point through the processor 40 and then performing a new channel access procedure with reference to the new transmission start point.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 22 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method for transmitting an uplink signal on a plurality of unlicensed Component Carriers (CCs) belonging to different Timing Advance Groups (TAGs) by a user equipment (UE) in a wireless communication system supporting an unlicensed band, the method comprising:

determining a start point of a subframe that is earliest in a time domain from a specific timing among subframes on the plurality of the unlicensed CCs as a first transmission start point;

performing a first channel access procedure on the plurality of the unlicensed CCs based on the first transmission start point; and based on a result of the first channel access procedure, performing an uplink signal transmission on the plurality of the unlicensed CCs from the first transmission start point, or performing a second channel access procedure for the uplink signal transmission based on a second transmission start point, wherein the second channel access procedure is different from the first channel access procedure, and the second transmission start point is different from the first transmission start point.

2. The method of claim 1, wherein the specific timing comprises:

a timing at which the UE attempts the uplink signal transmission, or a timing at which the UE fails a channel access procedure performed in advance for the uplink signal transmission.

3. The method of claim 1, wherein the first channel access procedure and the second channel access procedure comprise Listen Before Talk (LBT) for the plurality of the unlicensed CCs.

4. The method of claim 1, wherein the UE performs the uplink signal transmission on the plurality of the unlicensed CCs from the first transmission start point based on a success of the first channel access procedure.

5. The method of claim 1, the performing the uplink signal transmission on the plurality of the unlicensed CCs, comprising:

transmitting an initial signal from the first transmission start point to a start point of a subframe on each of the plurality of the unlicensed CCs; and transmitting the uplink signal from the start point of the subframe on each of the plurality of the unlicensed CC after the first transmission start point.

6. The method of claim 5, wherein the initial signal comprises:

a signal configured in advance on a system, or a portion or whole of the uplink signal to be transmitted after the initial signal.

7. The method of claim 1, wherein the UE performs the second channel access procedure for the uplink signal transmission based on a failure of the first channel access procedure.

8. The method of claim 1, performing the second channel access procedure comprising:

determining a start point of the subframe that is earliest in the time domain after the first transmission start point among subframes on the plurality of the unlicensed CCs as the second transmission start point; and performing the second channel access procedure on the plurality of the unlicensed CCs based on the second transmission start point.

9. The method of claim 1, wherein the UE is connected to the plurality of the unlicensed CCs by a dual connectivity.

10. A user equipment (UE) configured to transmit an uplink signal on a plurality of unlicensed Component Carriers (CCs) belonging to different Timing Advance Groups (TAGs) in a wireless communication system supporting an unlicensed band, the UE comprising:
   a transmitter;
   a receiver; and
   a processor configured to operate by being connected to the transmitter and the receiver,
   wherein the processor is further configured to:
   determine a start point of a subframe that is earliest in a time domain from a specific timing among subframes on the plurality of the unlicensed CCs as a first transmission start point;
   perform a first channel access procedure on the plurality of the unlicensed CCs based on the first transmission start point; and
   based on a result of the first channel access procedure, perform an uplink signal transmission on the plurality of the unlicensed CCs from the first transmission start point, or perform a second channel access procedure for the uplink signal transmission based on a second transmission start point,
   wherein the second channel access procedure is different from the first channel access procedure, and the second transmission start point is different from the first transmission start point.

11. The UE of claim 10, wherein the specific timing comprises:
   a timing at which the UE attempts the uplink signal transmission, or
   a timing at which the UE fails a channel access procedure performed in advance for the uplink signal transmission.

12. The UE of claim 10, wherein the first channel access procedure and the second channel access procedure comprise Listen Before Talk (LBT) for the plurality of the unlicensed CCs.

13. The UE of claim 10, wherein the UE performs the uplink signal transmission on the plurality of the unlicensed CCs from the first transmission start point based on a success of the first channel access procedure.

14. The UE of claim 10, wherein performing the uplink signal transmission on the plurality of the unlicensed CCs comprises:
   transmitting an initial signal from the first transmission start point to a start point of a subframe on each of the plurality of the unlicensed CCs; and
   transmitting the uplink signal from the start point of the subframe on each of the plurality of the unlicensed CC after the first transmission start point.

15. The UE of claim 14, wherein the initial signal comprises:
   a signal configured in advance on a system, or
   a portion or whole of the uplink signal to be transmitted after the initial signal.

16. The UE of claim 10, wherein the UE is configured to perform the second channel access procedure for the uplink signal transmission based on a failure of the first channel access procedure.

17. The UE of claim 10, wherein performing the second channel access procedure comprises:
   determining a start point of the subframe that is earliest in the time domain after the first transmission start point among subframes on the plurality of the unlicensed CCs as the second transmission start point; and
   performing the second channel access procedure on the plurality of the unlicensed CCs based on the second transmission start point.

18. The UE of claim 10, wherein the UE is configured to connect to the plurality of the unlicensed CCs by a dual connectivity.

19. A processing apparatus configured to control a user equipment (UE) to transmit an uplink signal on a plurality of unlicensed Component Carriers (CCs) belonging to different Timing Advance Groups (TAGs) in a wireless communication system supporting an unlicensed band, the processing apparatus comprising:
   at least processor; and
   at least one computer memory operably connected to the at least one processor and storing instructions that, based on being executed by the at least one processor, perform operations comprising:
   determining a start point of a subframe that is earliest in a time domain from a specific timing among subframes on the plurality of the unlicensed CCs as a first transmission start point;
   performing a first channel access procedure on the plurality of the unlicensed CCs based on the first transmission start point; and
   based on a result of the first channel access procedure, performing an uplink signal transmission on the plurality of the unlicensed CCs from the first transmission start point, or performing a second channel access procedure for the uplink signal transmission based on a second transmission start point,
   wherein the second channel access procedure is different from the first channel access procedure, and the second transmission start point is different from the first transmission start point.

* * * * *